United States Patent
Jönsson et al.

(10) Patent No.: US 6,923,301 B2
(45) Date of Patent: Aug. 2, 2005

(54) HYDRODYNAMIC BRAKE

(75) Inventors: Hans Jönsson, Sodertalje (SE); Johnny Arne, Sodertalje (SE); Torger Hagen, Sodertalje (SE); Anders Kjell, Stockholm (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 10/332,420

(22) PCT Filed: Jun. 28, 2001

(86) PCT No.: PCT/SE01/01489
§ 371 (c)(1),
(2), (4) Date: May 30, 2003

(87) PCT Pub. No.: WO02/04834
PCT Pub. Date: Jan. 17, 2002

(65) Prior Publication Data
US 2003/0188940 A1 Oct. 9, 2003

(30) Foreign Application Priority Data
Jul. 7, 2000 (SE) .............................................. 0002589

(51) Int. Cl.$^7$ .............................................. F16D 57/02
(52) U.S. Cl. ..................................... 188/296; 192/3.34
(58) Field of Search ................................ 188/296, 301, 188/269; 192/3.34, 3.32

(56) References Cited

U.S. PATENT DOCUMENTS

| | | | |
|---|---|---|---|
| 3,072,222 A | * 1/1963 | Kugel et al. | 188/296 |
| 3,774,735 A | * 11/1973 | Hanke et al. | 188/296 |
| 3,888,335 A | * 6/1975 | Hanke | 188/290 |
| 4,361,211 A | * 11/1982 | Lindenthal | 188/296 |
| 4,458,792 A | * 7/1984 | Thomas et al. | 188/296 |
| 4,773,513 A | * 9/1988 | Herrmann et al. | 188/296 |
| 5,263,320 A | * 11/1993 | Hall, III | 60/360 |
| 5,771,997 A | * 6/1998 | Friedrich et al. | 188/296 |

FOREIGN PATENT DOCUMENTS

| | | |
|---|---|---|
| DE | 2238726 | 2/1974 |
| EP | 0233331 | 8/1987 |

\* cited by examiner

Primary Examiner—Robert A. Siconolfi
(74) Attorney, Agent, or Firm—Ostrolenk, Faber, Gerb & Soffen, LLP

(57) ABSTRACT

A hydrodynamic brake, which comprises a stator and a rotor which are coaxial and have respective opposed annular recesses which open toward each other to form a toroid-shaped space. A first medium is supplied to the space for providing braking action during rotation of the rotor. At least one injection member is arranged to supply a second medium to the toroid-shaped space for reducing the circulation of air in the toroid-shaped space when no brake action is desired. The second medium is supplied at at least one location to the toroid-shaped space with a pressure and in a direction which at least partly is directed towards the principal flow direction of the circulating air.

9 Claims, 3 Drawing Sheets

HYDRODYNAMIC BRAKE

BACKGROUND OF THE INVENTION AND PRIOR ART

The present invention relates to a hydrodynamic brake which reduces the circulation of air in the space in the brake.

In the use of hydrodynamic brakes, such as retarders in vehicles, a certain brake action always arises during the propulsion of the vehicle as a consequence of the rotation of the rotor with a driving shaft of the vehicle. This brake action is caused by the air in the toroid-shaped space being forced to circulate. The circulating air provides a brake action in a way corresponding to the action of the introducable medium when the air circulates in the toroid-shaped space. The supplied medium is usually an oil having suitable properties. Although the density of the air is only a fraction of the density of the oil, the brake action arising hereby is not entirely negligible. The fuel consumption of a vehicle having a retarder therefore becomes unnecessarily high.

In order to reduce this circulation of air in the toroid-shaped space between the stator and the rotor, a plurality of different solutions have been proposed. A so-called dazzling-screen is for example used which is intended to be moved into the gap between the stator and the rotor for preventing said circulation of air, when no brake action is desired. The use of dazzling-screens includes a plurality of movable mechanical parts, which results in a complicated construction.

EP 233 331 discloses supplying a blocking medium to the toroid-shaped space of a retarder in order to reduce the circulation of air and thus to reduce the brake action obtained by the circulating air. The blocking medium is supplied radially directed in the toroid-shaped space. It is intended that the supplied blocking medium form a blocking medium curtain in the area between the stator and the rotor such that the circulation of air between the stator and the rotor is reduced. If the medium is not inserted with a sufficiently high velocity, the heavy circulation of air, which may amount to 100 m/s in the toroid-shaped space, will relatively quicky move the supplied blocking medium towards the walls of the toroid-shaped space.

SUMMARY OF THE INVENTION

The object of the present invention is to provide a hydrodynamic brake comprising means, which in a simple and effective way reduces the circulation of air in the toroid-shaped space, which arises in the hydrodynamic brake when no brake action is desired to be obtained.

This object is achieved by a hydrodynamic brake which supplies the second medium with a high pressure and in a direction partly towards the circulating air stream. Retardation of the velocity of the circulating airflow is obtained when the medium hits the circulating air. By supplying the medium with a suitably high pressure, it penetrates through the outermost air layer in the toroid-shaped space, which has the highest velocity. This is necessary for preventing the second medium, substantially immediately after it has been supplied, from being moved towards the walls of the toroid-shaped space by the radially outermost air stream. The second medium, which is supplied under pressure, is finely dispersed in the toroid-shaped space to a medium mist, which retards the velocity of the circulating air.

According to a preferred embodiment of the present invention, the second medium is arranged to be supplied in the form of at least one jet. The jet may have a suitable shape and a pressure, which actively reduces the direction of motion and the velocity of the air. Such jets should be supplied with a velocity of above 10 m/s in order to guarantee that they will be able to retard and penetrate the outermost air layer in the toroid-shaped space. Preferably, the velocity should be at least 20 mIs. Alternatively, the second medium may be supplied as a number of jets in order to obtain a more spread influence on the circulating air in the toroid-shaped space. Advantageously, the second medium is identical with the first medium in the brake. The first medium is usually an oil. Such an oil is, in most cases, also suitable as a medium for reducing the circulation of air in the toroid-shaped space. By using the same medium for preventing circulation of air as for providing a brake action, handling of the second medium is simplified. No special collecting containers for the second medium need be provided, for example.

According to another preferred embodiment of the present invention, the means comprises at least one injection member, which is arranged to inject the second medium into the toroid-shaped space. Such an injection member is arranged to supply the second medium into the toroid-shaped space with a suitable pressure. The injection member may also comprise a suitable nozzle, which provides one or several jets with a suitable shape for reducing the circulation of air. The injection member may supply the second medium from a radially outwardly located portion of the toroid-shaped space. Thereby, the second medium may be injected towards the circulating air in an area when the air flows from the rotor to the stator and has its highest velocity. Advantageously, the injection member supplies the second medium, in this case, via an orifice in a bottom surface of the recess of the stator. Since the stator is immobile, it is relatively uncomplicated to provide an injection member in the stator for the supply of the second medium in the area. In order to obtain an effective reduction of the velocity of the circulating air, the second medium should be supplied in a direction which has an angle of 15° to 45° to a radial direction, which extends from the orifice of the injection member to a center in the toroid-shaped space. The circulating air is presumed to circulate around in the toroid-shaped space along the bottom surfaces of the recesses of the stator and the rotor, whereby the principal flow direction of the air becomes substantially perpendicular to such a radial direction. The more the supply direction of the medium deviates from the radial direction, the more contrary the medium hits the circulating air stream. Advantageously, the second medium is supplied by one or several jets ma direction with an angle of 15° to 45° to the radial direction. An angle of about 30° seems to be the most favorable in order to retard most effectively the velocity of the circulating air stream at the same time as a considerable part of the second medium may pass through this air stream and form a medium mist in the toroid-shaped space.

According to another preferred embodiment of the present invention, the injection member may be arranged to inject the second medium from a radially inwardly located portion of the toroid-shaped space. The velocity of the circulating air is reduced in the passage from the stator to the rotor. Advantageously, the injection member is, in this case, provided is a shaft portion of the rotor and comprises an orifice in the bottom surface of the recess of the rotor. Advantageously, the second medium is supplied in a direction with an angle of 15° to 45° to a radial direction, which extends from the orifice of the injection member to a center in the toroid-shaped space. Supplying jets with a high pressure in an angle range of about 30° seems to be the most favorable for most efficiently retarding the circulating air stream at the same time as an effective medium mist is obtained in the toroid-shaped space. Suitably, the means comprises a plurality of injection members located both at radially outwardly and inwardly located portions and with constant intervals along the circular extension of the zoroid-shaped space. Thereby, the circulation of air may be counteracted effectively in the whole toroid-shaped space.

BRIEF DESCRIPTION OF THE DRAWINGS

In the following a preferred embodiment of the invention is described as an example with reference to the attached drawings, in which.

DETAILED DESCRIPTION OF A PREFERRED EMBODIMENT OF THE PRESENT INVENTION

Figure 1:
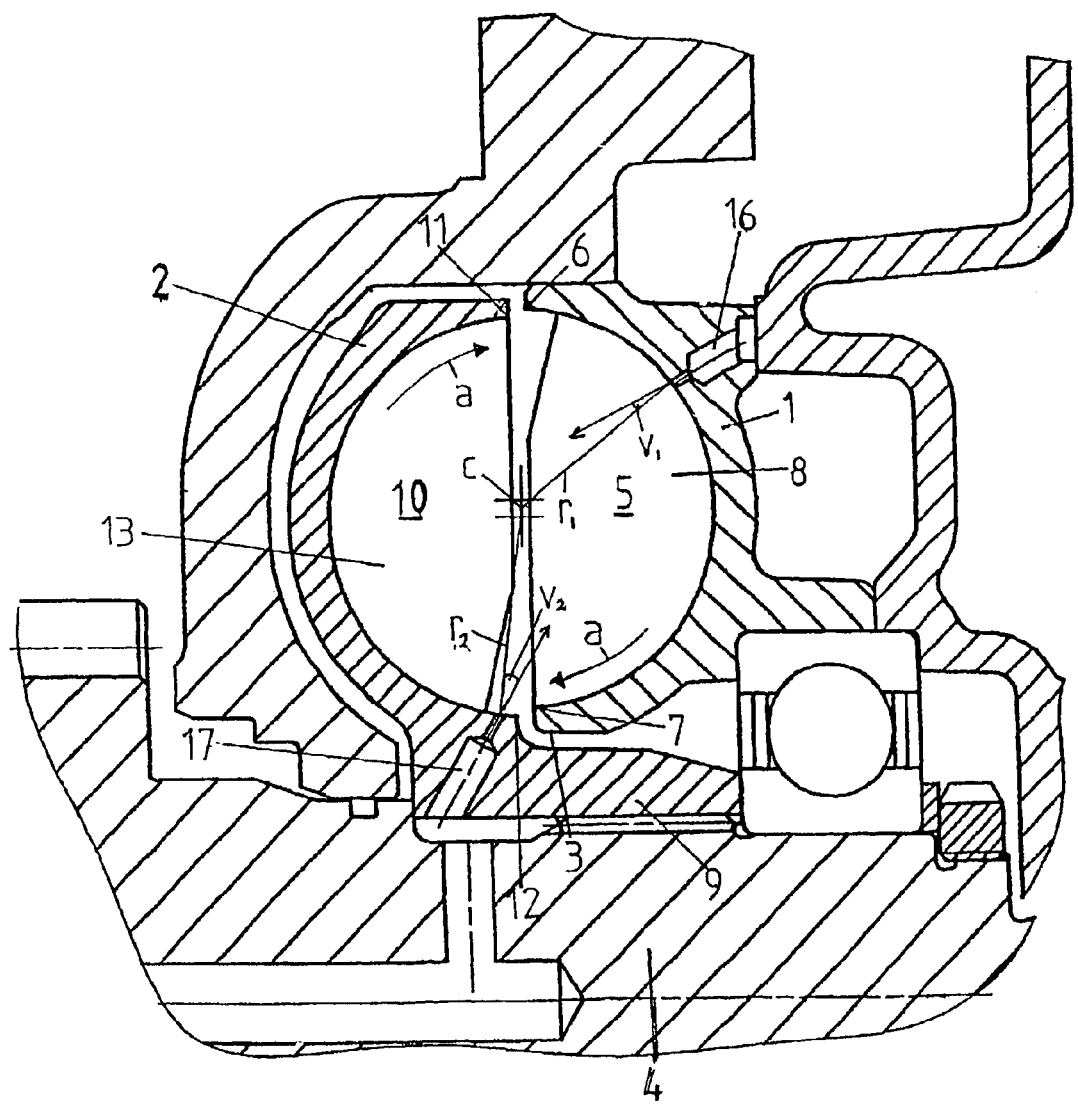
FIG. 1 shows a cross section through a portion of a hydrostatic brake according to the present invention.
Figure 2:
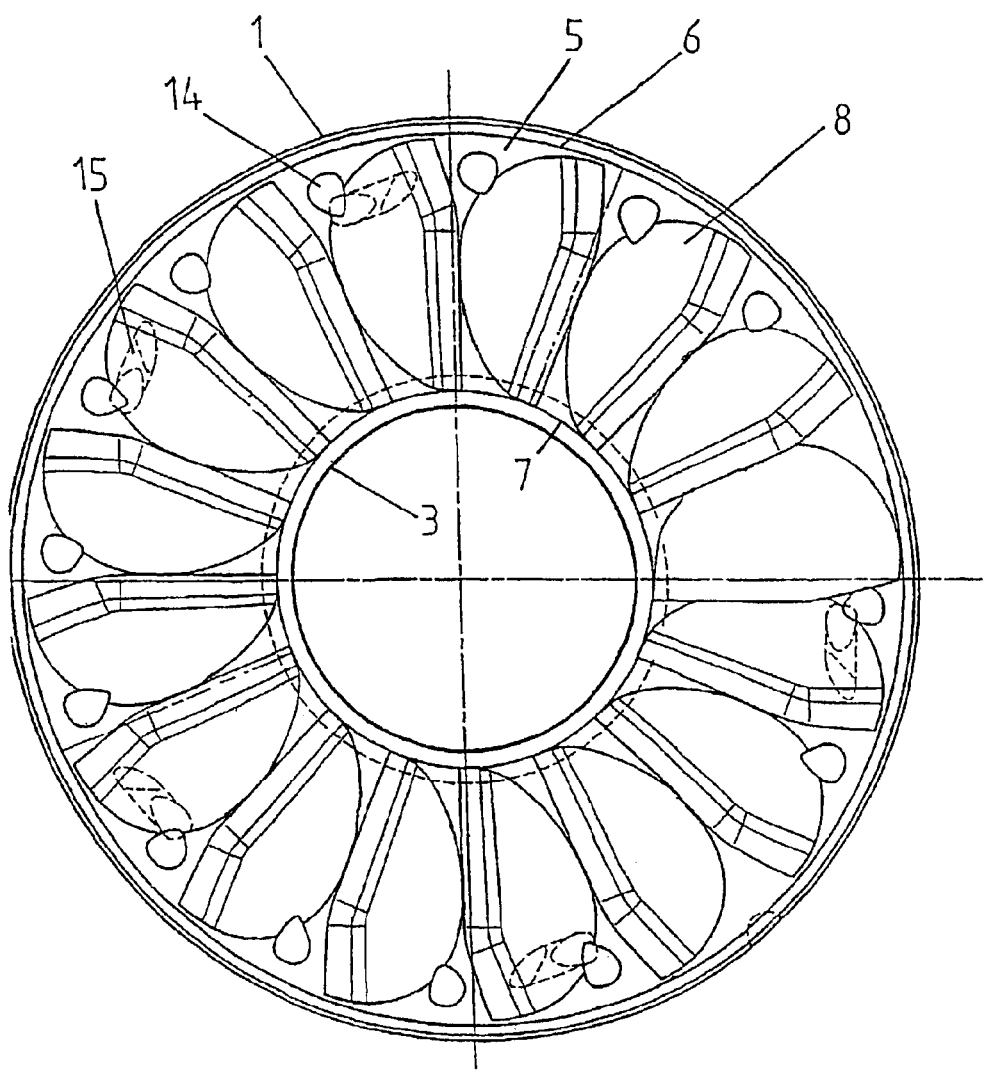
FIG. 2 shows separately the stator showed in FIG. 1

FIG. 1 shows a cross section through a portion of a hydrodynamic brake in form of a retarder of a motor driven vehicle. The retarder comprises a stator 1 and a rotor 2. The stator 1, which is shown separately in FIG. 2, comprises an annular body having an inner radial surface 3, which defines a circular opening. A rotatable shaft 4 extends through the circular opening of the stator 1. The rotatable shaft 4 is, via a transmission device, in connection with a driving shaft of the vehicle. The stator 1 is fixed in the vehicle in a suitable way. The body of the stator 1 comprises an annular recess 5, which in the mounted state of the retarder, extends around the rotatable shaft 4. The annular recess 5 is restricted in a radial direction outwards by an outer edge 6 and in a radial direction inwards by an inner edge 7. A number of vanes 8 are provided with uniform intervals along the circular extension of the annular recess 5. The vanes 8 have a substantially radial extension through the recess 5 from its inner edge 7 in a direction towards its outer edge 6. The lateral surfaces of the vanes 8 have an angle of about 45° in relation to the bottom surface of the recess 5.

Figure 3:
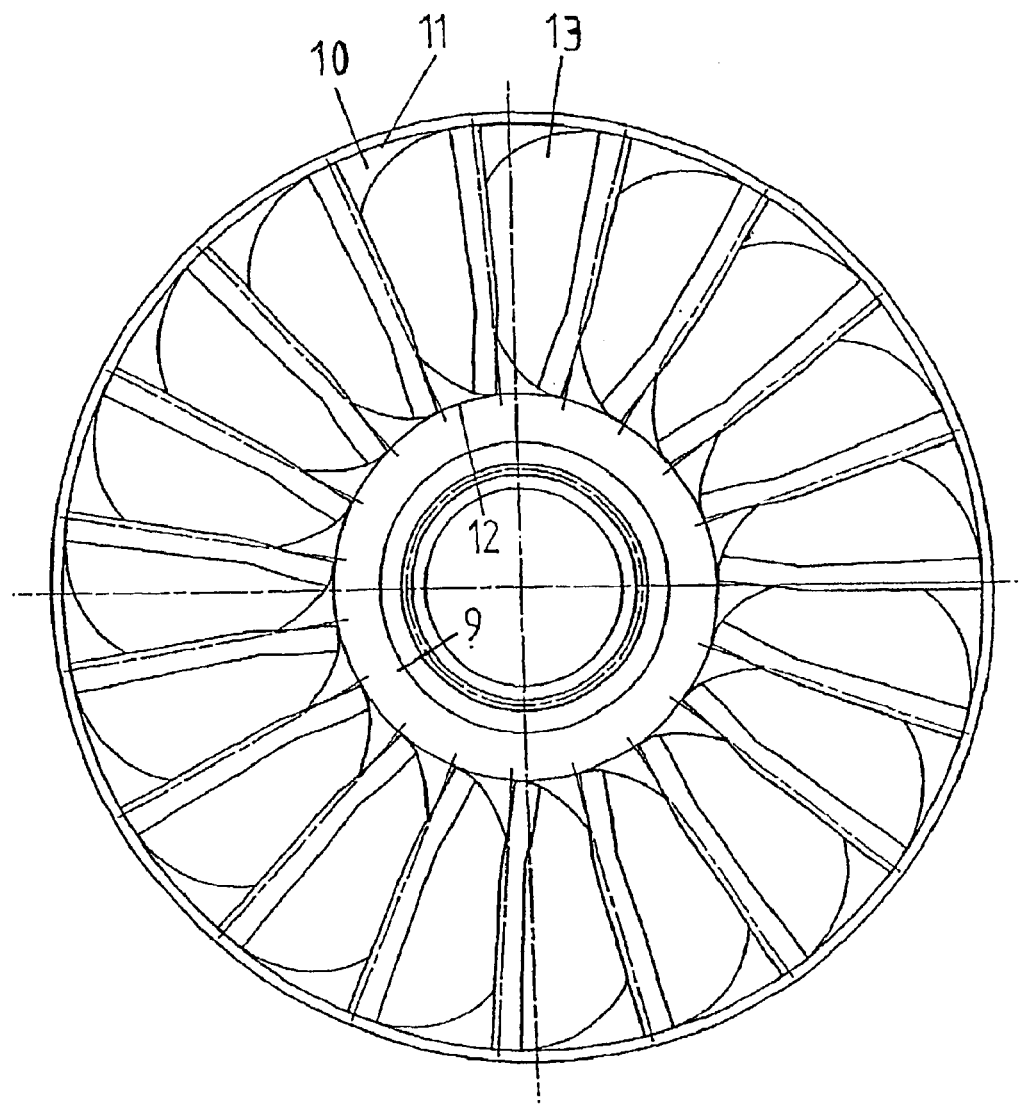
FIG. 3 shows separately the rotor showed in FIG. 1.

The rotor 2, which is shown separately in FIG. 3, comprises a body with a radially inward shaft portion 9, which is fixedly connected to the rotatable shaft 4, whereby the rotor 2 will rotate synchronously with the rotatable shaft 4. The rotor 2 moreover comprises a substantially corresponding construction as the stator 1 and comprises an annular recess 10, which extends around the rotatable shaft 4 in the mounted state of the rotor 2. The annular recess 10 is restricted radially outwards by an outer edge 11 and radially inwards by an inner edge 12. A plurality of vanes 13 are provided with uniform intervals along the circular extension of the annular recess 10. The vanes 13 have substantial radial extension through the recess 12 from its outer edge 11 in a direction towards its inner edge 12. Each of the lateral surfaces of the vanes 12 has an angle of about 45° in relation to the bottom surface in the recess 10.

The stator 1 and the rotor 2 are coaxially provided in relation to each other around the shaft 4 in such a way that the annular recesses 5, 10 of the stator 1 and the rotor 2 together form a toroid-shaped space, which extends around the rotatable shaft 4. The stator 1 comprises a plurality of openings 14 though which a medium, in the form of an oil, is introduceable to the toroid-shaped space when the vehicle is intended to be braked. The supplied oil is guided, during the rotation of the rotor 2, by the vanes 13 in the direction of rotation and radially outwards in the toroid-shaped space along the bottom surface of the recess 10 and is thrown with a high velocity from the outer edge 11 of the recess 10 of the rotor 2 over to the outer edge 6 of the recess 5 of the stator 1. The direction of rotation of the oil in the toroid-shaped space is shown by the arrows a in FIG. 1. The oil hits the vanes 8 of the stator 1 and the motion of the oil in the direction of rotation of the rotor 2 is retarded and the oil is guided by the vanes 8 radially inwards along the bottom surface of the recess 5 until it reaches the inner edge 7 of the recess 5. Here, the oil again is thrown over to the rotor 2 and hits the rotor 2 at the inner edge surface 12 of the recess 10. The oil hits the rotating vanes 13 of the rotor 2 at an angle in such a way that a substantially optimal brake action is obtained by the rotor 2. Thereafter the oil is guided by the rotating vanes 13 at the same time as it is guided radially outwards along the bottom surface of the recess 10. The brake action obtained by the rotor 2 depends partly on the quantity of oil which is supplied and is circulated in the toroid-shaped space and partly on the rotary speed of the rotor 2. During the braking process, the kinetic energy of the oil is transformed to heat energy. The stator 1 comprises a number of openings 15 through which the oil is arranged to be removed from the toroid-shaped space, when a brake action is not any longer desired.

In a corresponding way as the circulating oil supplies a brake action to the rotor, a circulation of the existing air in the toroid-shaped space supplies a brake action. Said circulation of air is a problem when no brake action is desired. Since the air has a much lower density than oil, the brake action, which is supplied by the circulating air, becomes considerably lower than the one provided by the oil. However, the supplied brake action is not entirely negligible and results in, for example, at the propulsion of a motor vehicle, an unnecessarily high fuel consumption.

In order to counteract such a circulation of air, a first injection member 16 has been provided at an outer portion of the stator 1. The first injection member 16 is arranged to supply a second medium, which with advantage is identical with the oil used for obtaining a brake action in the retarder. The first injection member 16 supplies the second medium by one or several jets, which are supplied with a high pressure in such a way that the medium obtains an initial velocity of about 20 m/s. The jets are arranged to be injected in a direction which deviates with an angle $v_1$ of about 30° to a radial direction $r_1$, which extends from the orifice of the injection member 16 and through a centre c in the toroid-shaped space. The principal air stream obtains a corresponding flow direction a as the oil. Consequently, the air stream follows substantially the bottom surfaces of the toroid-shaped space in the stator 1 and the rotor 2. Thus, the substantial flow direction a of the air becomes in the injection area substantially perpendicular to such a radial direction $r_1$. The larger angle, at which the second medium is supplied to the toroid-shaped space, to said radial direction, the more contrary the medium hits the circulating air stream. However, the injection angle $v_1$ may be varied within a range from 15° to 45°. The injected second medium counteracts here the passage of the air from the rotor 2 to the stator 1 before it forms a medium mist in the toroid-shaped space.

A second injection member 17 is provided in a shaft portion 9 of the rotor 2 and comprises an orifice in the bottom surface of the recess 10 of the rotor 2. The second injection member 17 is arranged to supply the second medium by a plurality of jets with a high pressure. The jets are arranged to be injected in a direction which deviates with an angle $v_2$ to a radial direction $r_2$, which extends from the orifice of the injection member 17 and through said centre c in the toroid-shaped space. However, the injection angle $v_2$ may be varied within a range from 15° to 45°. The injected medium counteracts here the passage of the air from the stator 1 to the rotor 2 before it forms a medium mist in the toroid-shaped space.

The first 16 and the second 17 injection members are provided so that the injected second medium first of all has to reduce the velocity of the air during the passage between the stator and rotor in one of the directions. Here, the velocity of the air may be substantially considerably reduced by supplying the medium with a high velocity in a direction partly towards the flow direction a of the air. By supplying the jets with a high velocity, the medium passes principally through at least the outermost air layer and obtains a spreading such that a medium mist of small finely dispersed medium droplets are formed, which further counteract the circulation of air between the stator and the rotor in the toroid-shaped space. However, the formed oil droplets are gradually moved towards the bottom surface of the recess 5, 10 of the stator 1 or the rotor 2, whereafter the oil is guided out. The first 16 and second 17 injection members are with advantage provided at constant intervals along the extension of the toroid-shaped space for counteracting the circulation of air between the stator 1 and the rotor 2 along the whole extension of the toroid-shaped space.

The present invention is not in any way restricted to the above embodiment described in the drawings but may be modified freely within the scopes of the claims.

What is claimed is:

1. A hydrodynamic brake comprising:

a stator having an axis, a coaxial rotor for cooperating with the stator and rotatable around the axis, the stator being shaped to define an annular recess opening toward the rotor and a plurality of stator vanes extending toward the rotor, the annular recess of the stator has a bottom surface defining the annular recess thereof, the rotor being shaped to define an annular recess opening toward the recess of the stator and the rotor having a plurality of rotor vanes extending toward the stator, both the stator recess and the rotor recess together define a toroid-shaped space;

a supply of a first medium to the toroid-shaped space for providing a brake action during rotation of the rotor by the first medium cooperating with the vanes of the stator and the rotor during rotation of the rotor;

at least one inlet for supplying a second medium to the toroid-shaped space such that the second medium reduces circulation of air in the toroid-shaped space during rotation of the rotor with respect to the stator, wherein the second medium inlet is arranged to supply the second medium at at least one location in the toroid-shaped space and with a pressure and in a supply direction into the space which is at least partly directed toward the principal flow direction of air circulating in the toroid-shaped space during rotation of the rotor; the at least one inlet for supplying the second medium includes at least one inlet jet for supplying a jet of the medium into the toroid-shaped space, the inlet jet includes an injection portion shaped and positioned to inject the second medium into the toroid-shaped space, the injection portion for the second medium comprises an orifice arranged in the bottom surface of the recess of the stator so as to supply the second medium at an injection angle between 15° and 45° to a radius that extends from the orifice to a center of the toroid-shaped space.

2. The hydrodynamic brake of claim 1, wherein the second medium supplied by the jet is the same as the first medium supplied to the toroid-shaped space for braking action on the vanes.

3. The hydrodynamic brake of claim 1, wherein the toroid-shaped space has a radially inward portion, and the injection portion is positioned to inject a second medium from the radially inward portion of the toroid-shaped space.

4. The hydrodynamic brake of claim 1, wherein the toroid-shaped space has a radially outward portion, and the injection portion is shaped, oriented and positioned to supply second medium in the radially outward portion of the toroid-shaped space.

5. The hydrodynamic brake of claim 1, wherein the rotor has a shaft portion about which the rotor rotates around the axis, the rotor recess has a bottom surface defining the recess, the injection portion is defined in the shaft portion of the rotor.

6. The hydrodynamic brake of claim 1, wherein the rotor has a shaft portion about which the rotor rotates around the axis, the rotor recess has a bottom surface defining the recess, and further including a second inlet jet for supplying the medium into the toroid-shaped space, the second inlet jet including a further injection portion defined in the shaft portion of the rotor, which further injection portion comprises an orifice in the bottom surface of the recess of the rotor.

7. The hydrodynamic brake of claim 6, wherein the further injection portion is shaped and positioned to supply second medium in a direction having an angle of between 15° to 45° to a radial direction and which extends from the orifice of the injection member and through a center in the toroid-shaped space.

8. The hydrodynamic brake of claim 7, wherein the stator recess, the rotor recess and the vanes therein arc shaped to drive circulating air in a pathway around and between the recesses;

the inlet for supplying second medium is directed to supply the second medium in a direction which tends to change the direction of flow of around the toroid-shaped space air around the recesses thereby to reduce the braking effect of the circulating air on the rotor.

9. The hydrodynamic brake of claim 1, wherein the stator recess, the rotor recess and the vanes therein are shaped to drive circulating air in a pathway around and between the recesses;

the inlet for supplying second medium is directed to supply the second medium in a direction which tends to change the direction of flow of around the toroid-shaped space air around the recesses thereby to reduce the braking effect of the circulating air on the rotor.

* * * * *